(12) United States Patent
Chai

(10) Patent No.: US 8,832,698 B1
(45) Date of Patent: *Sep. 9, 2014

(54) EVENT-DRIVEN STATE THREAD ARCHITECTURE

(75) Inventor: Mu Chai, Bellevue, WA (US)

(73) Assignee: EMC Corporation, Hopkinton, MA (US)

(*) Notice: Subject to any disclaimer, the term of this patent is extended or adjusted under 35 U.S.C. 154(b) by 1042 days.

This patent is subject to a terminal disclaimer.

(21) Appl. No.: 11/967,875

(22) Filed: Dec. 31, 2007

(51) Int. Cl.
*G06F 9/46* (2006.01)

(52) U.S. Cl.
USPC .......................................... 718/102; 718/106

(58) Field of Classification Search
None
See application file for complete search history.

(56) References Cited

U.S. PATENT DOCUMENTS

| | | | |
|---|---|---|---|
| 4,761,732 A | | 8/1988 | Eldumiati et al. |
| 5,355,488 A | * | 10/1994 | Cox et al. ................ 718/100 |
| 6,684,259 B1 | | 1/2004 | Discavage et al. |
| 6,728,960 B1 | * | 4/2004 | Loomans ................. 718/102 |
| 6,904,597 B2 | | 6/2005 | Jin |
| 7,080,375 B2 | * | 7/2006 | Martin .................... 718/100 |
| 7,337,444 B2 | | 2/2008 | Browning et al. |
| 7,559,065 B1 | * | 7/2009 | Sosnovsky et al. ...... 719/318 |

OTHER PUBLICATIONS

U.S. Appl. No. 11/968,029, filed Dec. 31, 2007, Chai et al.
U.S. Appl. No. 11/968,029, Jul. 8, 2011, Office Action.
U.S. Appl. No. 11/968,029, Dec. 22, 2011, Final Office Action.
U.S. Appl. No. 11/968,029, Oct. 22, 2012, Office Action.
U.S. Appl. No. 11/968,029, Apr. 18, 2013, Final Office Action.
U.S. Appl. No. 11/968,029, Nov. 7, 2013, Office Action.

* cited by examiner

*Primary Examiner* — Meng An
*Assistant Examiner* — Wissam Rashid
(74) *Attorney, Agent, or Firm* — Workman Nydegger

(57) ABSTRACT

An application framework is disclosed for receiving requests for access to application modules. A module thread is instantiated and placed in a wait state for each request and the application framework associates a plurality of predefined events with a plurality of event handling functions for each event. Upon receiving a user generated event, the application framework sets a corresponding module thread to execute the corresponding event handling function and changes the thread state to 'running.' Threads in the 'running' state are executed concurrently under the control of a system thread manger and are returned to a 'wait' state when the handling function ends. Each such thread maintains the session state throughout the use of the application.

22 Claims, 5 Drawing Sheets

EVENT-DRIVEN STATE THREAD ARCHITECTURE

BACKGROUND OF THE INVENTION

1. The Field of the Invention

The present invention relates to multi-threading computer applications and, more particularly, to managing persistent multi-threading connections for multiple distinct modules.

2. The Relevant Technology

Many applications, particularly those for use by consumers, are event-driven. Processing is centered on events generated by the user, such as mouse movements and clicks, key presses, and the like. Execution consists of catching events and processing them according to the applications handling functions. Modern applications may be extremely complex and are often organized into a number of modules, each relating to a specific task or class of tasks. Although the modules may not interact with one another, they typically operate subject to the control of a main application.

Web-based applications are also event-driven. User clicks and text input is transmitted to an application executed on a server. The server processes the user inputs and may update a web page or remote client interface in response. A typical web-based application must support multiple users accessing the application from workstations connected to the internet.

A common architecture for modular and web-based application is an Event-driven State Machine (EDSM). The EDSM receives events from each module or web-based user and processes them one at a time, thus multiplexing multiple currently executing modules or web-based sessions. Each module or web-based session is a separate context comprising data indicating its current processing state.

The EDSM architecture is ineffective in many respects. Because each session is a monolithic application, it must internally maintain data regarding the state of each module or user session. It further must manage switching between contexts of each module or user session, including prioritizing, allocating resources, optimizing processor efficiency by ensuring that the active context is not waiting for another resource such as a printer or hard drive. This complexity of EDSM architectures requires a great deal of processor time and makes them difficult to design, program, and debug.

In view of the foregoing it would be an advancement in the art to provide an architecture for modular and web-based applications that overcomes many of the deficiencies of the EDSM architecture.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
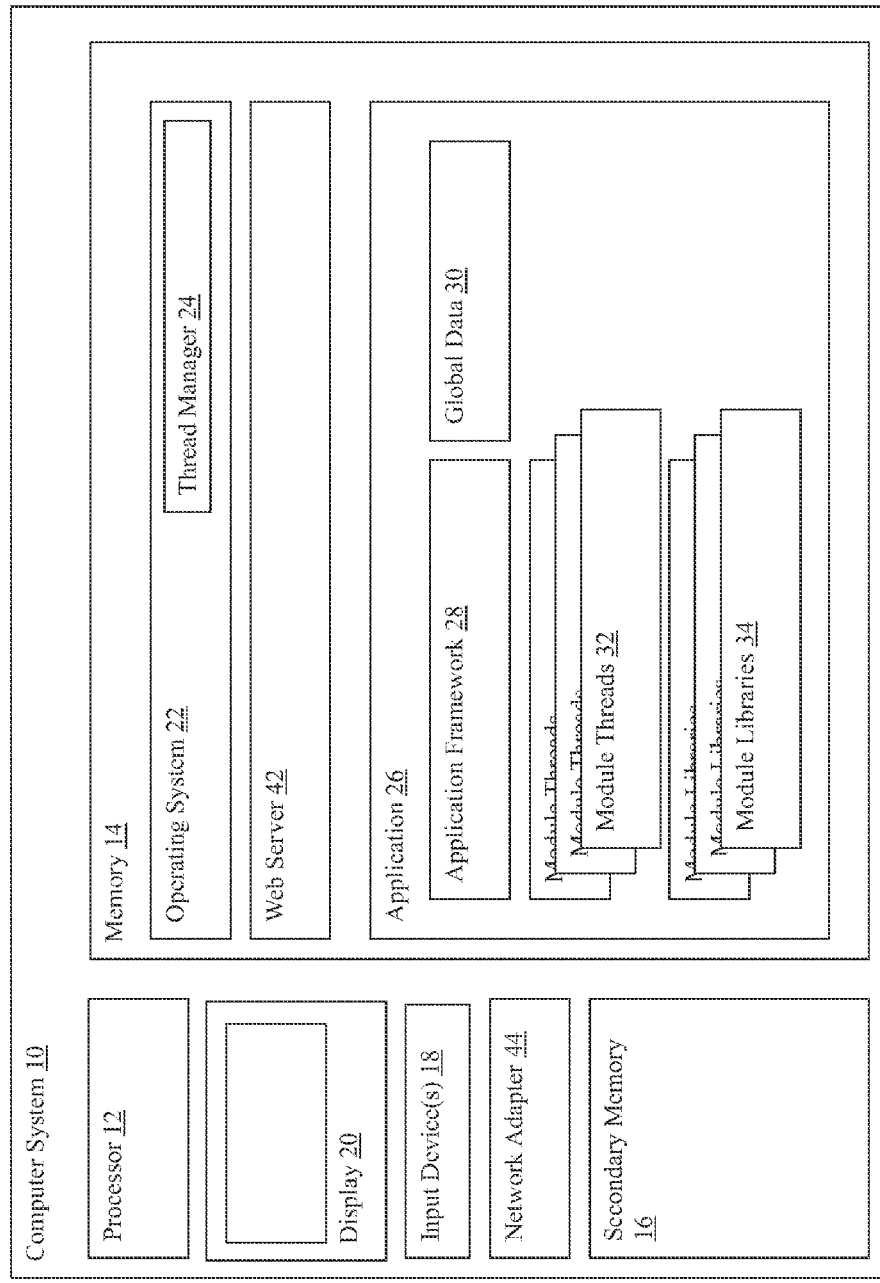
FIG. 1 is a schematic block diagram of a computer system hosting an application having event-driven state threads in accordance with an embodiment of the present invention.

Referring to FIG. 1, a computer system 10 includes a processor 12 and a memory 14, such as a random access memory RAM. The processor 12 is operable to execute instructions and process data stored in the memory 14. The processor 12 may also be coupled to secondary memory 16, such as a hard drive, flash memory, or the like, for storing additional executable and operational data. User inputs are provided to the processor 12 by input devices 18, such as a keyboard, mouse, touch screen, or the like. The processor 12 may output data to the user by means of a display 20. Other output devices coupled to the processor 12 may include a printer, network adapter, or the like.

The memory 14 may store an operating system 22 containing executable and operational data for causing the processor to execute basic input and output functions, manage computer resources, control the execution of applications, and providing user interface libraries for use by applications executed by the processor.

In a preferred embodiment of the invention, the operating system 22 includes thread manager 24 for controlling the concurrent execution of multiple threads (hereinafter "threads"). The thread management software preferably provides for creating threads, pausing the execution of threads, and associating a thread specific operating context with each thread, such as function libraries, static variables, and the like. The thread specific operating context is preferably local to the thread in scope. However, the thread preferably also accesses libraries and static variables of a global scope belonging to an application or process that creates the thread.

For purposes of this application threads refer to concurrently executing processes that are associated with a single executing application. The threads are part of the operating context of the application rather than independent processes instantiated by an operating system. For purposes of this application, threads may be in a 'wait' or 'non-wait' (active) state. In the 'wait' state the data structures defining the state of execution of the thread continue to exist within the memory of an executing computer. In the 'non-wait' state the thread is processed concurrently with other threads and processes according to thread processing protocols known in the art.

The memory 14 also stores an application 26 including an application framework 28 and corresponding global data 30, including function libraries, static variables, and other data relating to the application framework. The application 26 further includes a plurality of module threads 32. The module threads 32 each correspond to a module of the application having a distinct functionality from the other. Alternatively, the application may include a single module, which may be instantiated by multiple threads 32. The module threads 32 may also be different instances of multiple distinct modules that are either independent or interact with one another. The module threads 32 may be linked with module libraries 34 defining functions and data associated with each module. In a preferred embodiment, some libraries are linked to each thread 32 such that the static variables and functions of the library are associated with the operating context of the thread 32, rather than having global scope. The module libraries 34 may also define classes and objects defining the module threads 32 themselves, which are then instantiated by the application framework 28 to create the module threads 32.

Figure 2:
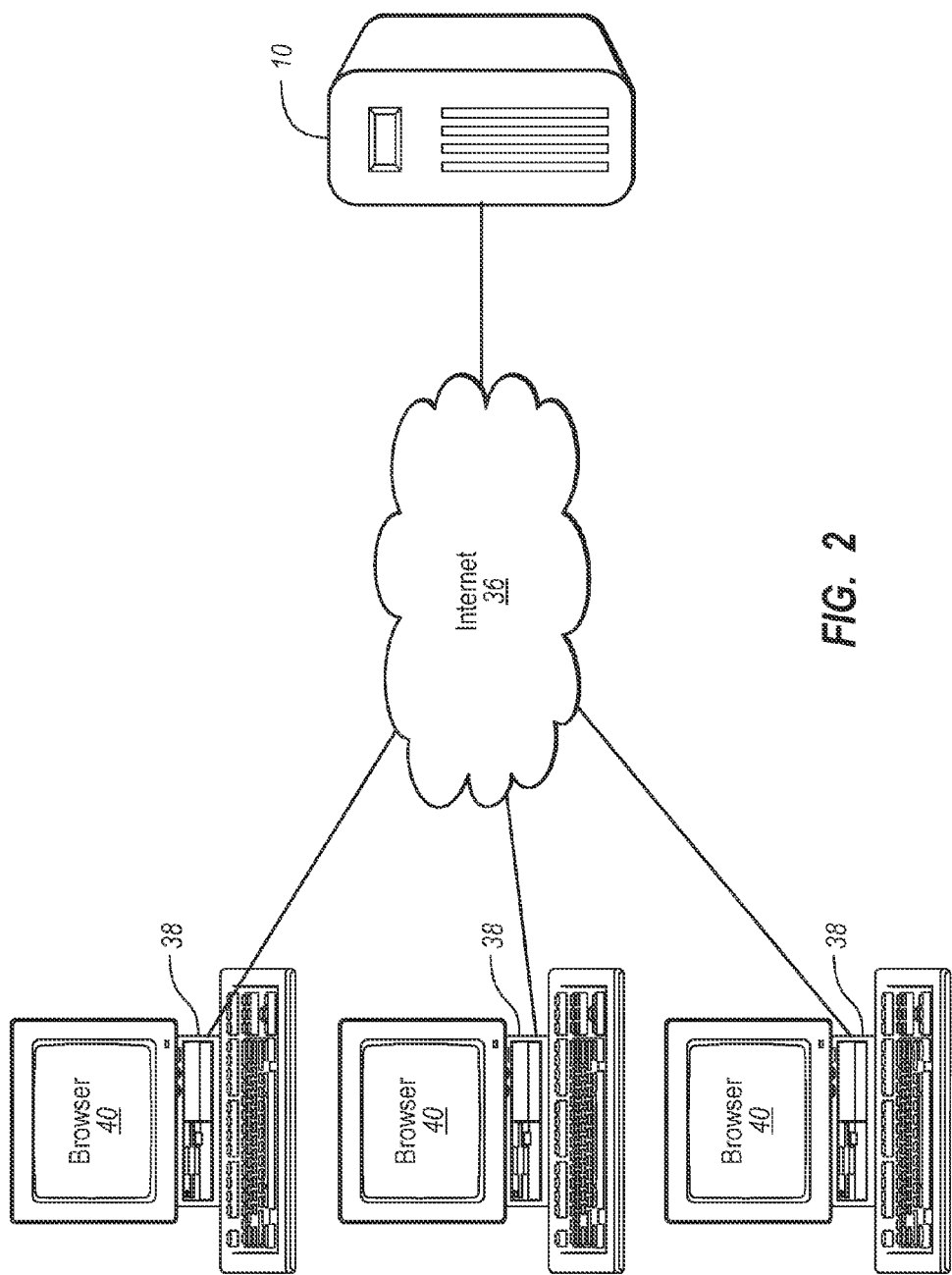
FIG. 2 is a schematic illustration of a networked environment in which an application having event-driven state threads may operate in accordance with an embodiment of the present invention.

Referring to FIG. 2, while still referring to FIG. 1, in some embodiments of the invention, the application 26 is a web-based application supporting concurrent execution of multiple sessions with remote workstations by means of a browser or client application. In such embodiments, the system 10 may be embodied as a server networked to the Internet 36, or other network, and able to communicate with remote workstations 38 executing a browser 40 or client application interface. The system 10 may host a web server 42 managing connections and the transfer of data between the remote workstations and the system 10. A network adapter 44, or other networking device provides a communication link to the Internet 40, or other network.

In such embodiments, the application 26 receives inputs from the remote workstation 38 hosting the browser 40, or other client interface. User events from the browser may include mouse movements and clicks, key presses, requests for a web page, and other inputs associated with a web browser, and the like. The events are communicated to the application framework 28 by the user's browser 40 or client application interface and handled by a corresponding module thread 32.

For users on remote workstations 38, the application framework 28 may instantiate a module thread 32 for each user session. The module threads 32 may correspond to the same or different modules. Module libraries 34 may define the functions and resources accessible by web based users of a module thread 32.

In one embodiment of the invention, each module thread 32 is created when a module is requested or on start-up of the application. The module thread 32 continues to exist as long as the application framework 28 is executed by the processor or until a user specifically instructs the application framework 28 to discontinue processing of the module corresponding to the module thread 32.

Each module thread 32 is programmed to respond to a set of events. After initializing, the module thread 32 places itself in a 'wait' state until one of the events occurs. When processing an event, the module thread 32 is placed in a 'non-wait' state, e.g. a "running" state. The module threads 32 registers with the application framework 28 a number of predefined event handling functions of the module, each corresponding to one of many possible user events that may be received by the application 26. The user events may include, mouse clicks or movements, key presses, and the like.

The application framework 28 receives events from the operating system 22 and determines which handling function of which module thread 32 corresponds to the event. The application framework 28 also examines if the corresponding module thread 32 is in the 'wait' state. If so, the application framework 28 then sets the appropriate module thread 32 to execute the event handling function and changes the state of the thread to its 'non-wait' state. The module thread 32 will then be executed according to the thread manager 24 of the operating system 22. Upon finishing execution, the module thread 32 changes its state to 'wait'.

In contrast with other threaded applications, the module threads 32 persist for the duration of the execution of the module or application. The persistence of the module threads 32 allows the operating context of the threads 32 to maintain data regarding the state of each module, relieving the burden from the application 26. In some embodiments, processing of the application framework 28 includes mapping user events to an appropriate thread, but does not require updating, loading, or processing data regarding the state of a particular module.

Figure 3:
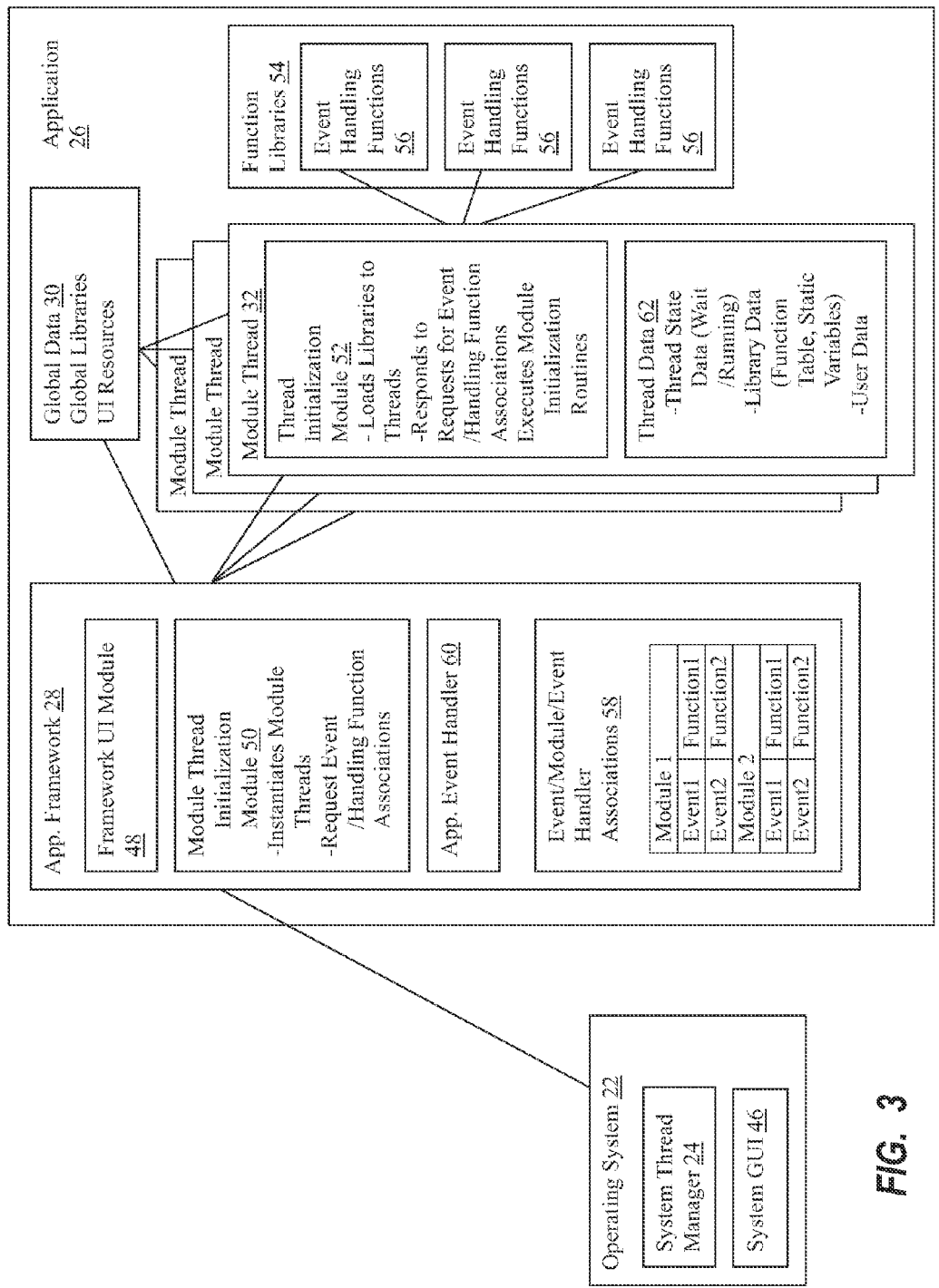
FIG. 3 is a schematic block diagram illustrating components of an application having event-driven state threads in accordance with an embodiment of the present invention.

Referring to FIG. 3, in some embodiments of the invention, the operating system thread manager 24 is programmed to control concurrent or quasi-concurrent execution of multiple threads. The system thread manager 24 typically enables a thread to transition to and from a 'wait' state, in which the thread does not execute but continues to exist within a pool of threads managed by the thread manager 24. The operating system 22 may host a local graphical user interface (GUI) 46 in embodiments where the user interacts locally with the computer system 10 executing the application 26.

The application framework 28 includes a framework user interface (UI) module 48. The framework UI module 48 receives requests for application resources, including application modules or web-based interactive sessions with a module. The framework user interface UI may display a console window on a local display 20 and receive requests in the form of user events received by the console window, such as mouse clicks on user interface elements, key presses, text entry, or the like.

The framework UI 48 may also be programmed to generate a web page transmitted to browser 40 executing on remote work stations 36. The web page may be transmitted to the browser 40 in response to web page requests in accordance with the HTML or other web-based protocol. Requests for access to application modules may be generated by the browser 40 and transmitted to the framework UI module 48 in response to a user entering a URL, clicking on a hyperlink or other element in the web page, or by any user input to the browser 40. In an alternative embodiment, requests for application modules may be transmitted in response to a user input to a dedicated client application program executing on the workstation 38.

Upon receiving a request, the framework UI module 48 invokes a module thread instantiation module 50. A module thread 32 is then instantiated by the module thread instantiation module 50 in response to the request. In some embodiments, the module threads 32 are instantiated upon startup of the application rather than upon receiving a request. The module thread 32 may be an instantiation of a module thread 32 corresponding to a specific module and may include a module thread initialization module 52 programmed to load appropriate libraries 54. Alternatively, the module thread 32 may be instantiated and instructed to load libraries corresponding to a specific module by the framework UI module 48. The libraries 54 may include event handling functions 56. Alternatively, the event handling functions 56 may be defined by the module itself of which the module thread 32 is an instance.

The module thread instantiation module 50 will, for each of a predefined set of possible events, pass an event identifier to the thread initialization module 52 of the module thread 32. In response, the module thread 32 returns a function identifier corresponding to the handling function that will process the event. The event identifier may be general such as 'mouse movement' or 'key press.' Alternatively, the event may include a user interface element identifier. For example the event might be of the form 'Button137.rightMouseClick.' The association between the module thread 32, event, and handling function will then be stored in an association table 58, or other data structure suitable for retaining the association data.

Other means for mapping handling functions to events are possible. For example, the thread initialization module 52 may pass an array or table mapping each event to a function.

In some embodiments, event-handling function associations are communicated to the application framework 28 after the thread is initialized. For example, during execution of the thread, a user interface element, such as a button or window, may be created. The module thread 32 may pass an identifier of the button, a user action, and a handling function identifier to the application framework 28, which will then store the association in the association table 58.

The thread initialization module 52 may also execute an initialization routine, which may, among other functions, generate a module user interface for the module. The module user interface may be in the form of a window including standard GUI elements or a web page transmitted to a user's browser 40.

Upon completing some or all of the initialization processes described above, the thread initialization module 52 may place the module thread 32 in a 'wait' state.

The application framework 28 may include an event handler 60. The event handler 60 receives user events from either the operating system for a local user or a remote browser 40 for web based users. The event handler 60 looks up the event in the association table 58 and identifies a corresponding module thread 32 and handling function. The event handler 60 then evaluates whether the corresponding module thread 32 is in a 'wait' state. If not, the event may be ignored. If the corresponding module thread 32 is in a 'wait' state, the event handler 60 sets the module thread 32 to execute the handling function corresponding to the event. The event handler 60 then changes the module thread 32 to a 'non-wait' state. The module thread 32 will then resume execution under the control of the system thread manager 42. When the handling function ends execution, the module thread 32 changes its state back to 'wait.'

During execution, the event handling function executes within the context of the module thread 32, which includes thread data 62, such as the thread state, library data such as static variables and functions, and other user data. Execution of the handling function may include accessing and modifying the thread data 62. Inasmuch as the module thread 32 continues to exist after each event, the changes to the state of the module thread 32 are also preserved. Because the module thread 32 has its own state data of thread-specific scope, there is not a risk of conflicts or data inconsistency that result when multiple threads of execution operate on common data. The module threads 32 may therefore use libraries that are not necessarily 'thread safe.' Such libraries are preferably statically linked to each module thread 32.

Figure 4:
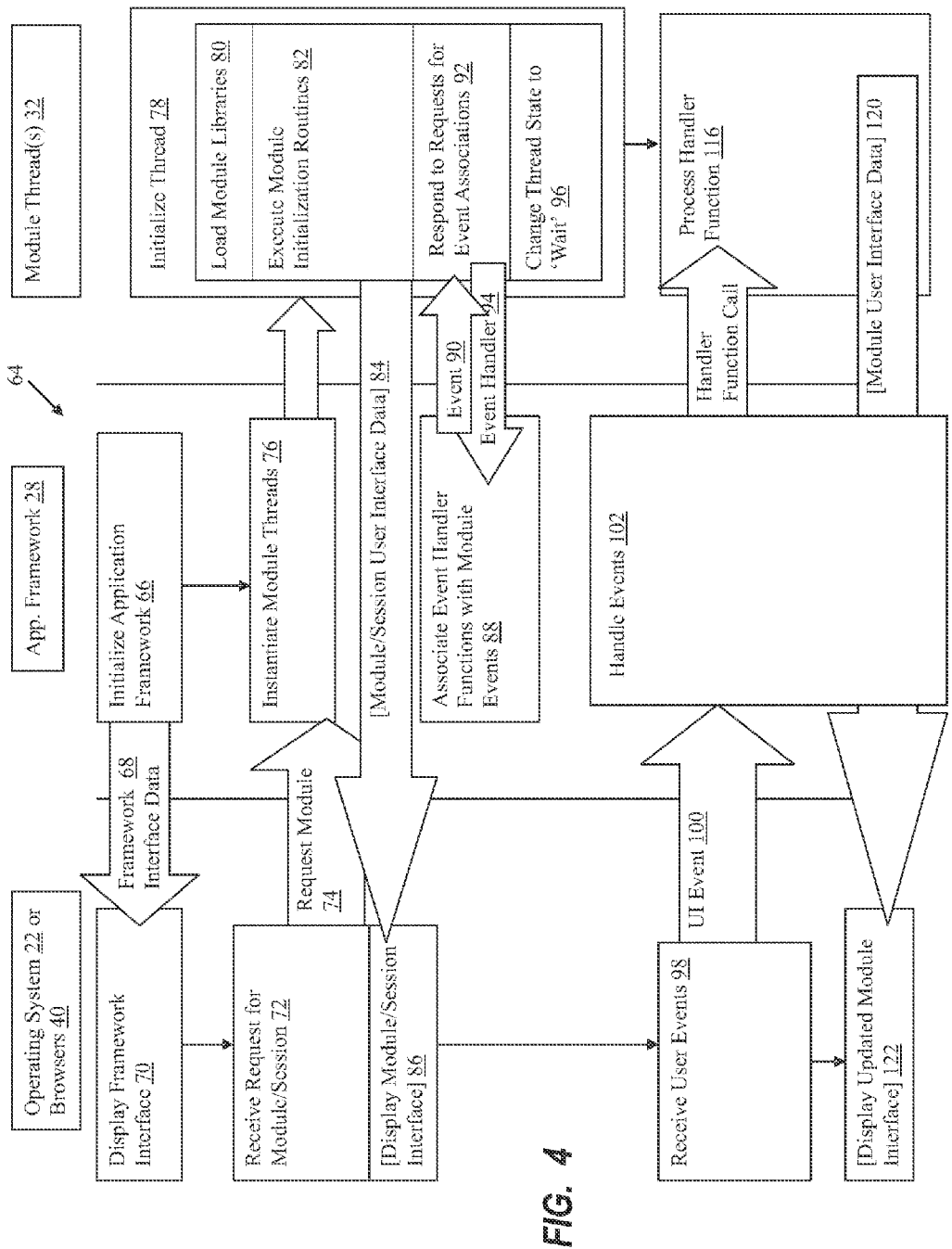
FIG. 4 is a process flow diagram of a method for using event-driven state threads in accordance with an embodiment of the present invention.

Referring to FIG. 4, a method 64 for executing an event-driven state machine application includes initializing an application framework at block 66. Block 66 may include loading global libraries and generating a framework interface, such as a main window on a local display 20 or a web page transmitted to a remote browser 40. At block 68, the framework interface data is sent to the GUI of a local operating system or a remote browser 40. And at step 70 the framework interface is displayed to a user either on a local display 20 or a remote workstation 38.

At block 72 a request for use of an application module is received either at a local GUI or a remote browser 40. The request is transmitted to the application framework 28 at step 74. In response, the application framework 28 instantiates a module thread 32 at step 76. At step 78 the module thread 32 is initialized. Step 78 may include loading module libraries, including static variables and library functions, at step 80 and executing a module initialization routine at step 82. Step 82 may include generating module interface data that is transmitted to the local GUI or remote browser 38 at step 84 and displayed on the local display 20 or browser 40 at step 86. In some embodiments, interaction with the thread modules 32 is through the framework UI 48 such that steps 84 and 86 may be omitted.

The application framework 28 may create associations between events, module threads 32, and handling functions at step 88. Step 88 may include passing an event identifier to the thread module at step 90. The module thread 32 responds to the event identifier at step 92 by identifying a handling function and passing the identity of the handling function at step 94 to the application framework, which stores the association between the handling function identifier and the event identifier. Steps 88-94 may be repeated for each of a finite set of events that the application framework 28 is programmed to receive. Alternatively, the module thread 32 may pass an array or table containing all event-handling function associations. At the end of the thread initializing step 78, the state of the module thread 32 is changed to 'wait' at step 96.

A user accessing the application may generate a user event that is received by a local GUI or remote browser at step 98. The event is transmitted to the application framework 28 at step 100.

Figure 5:
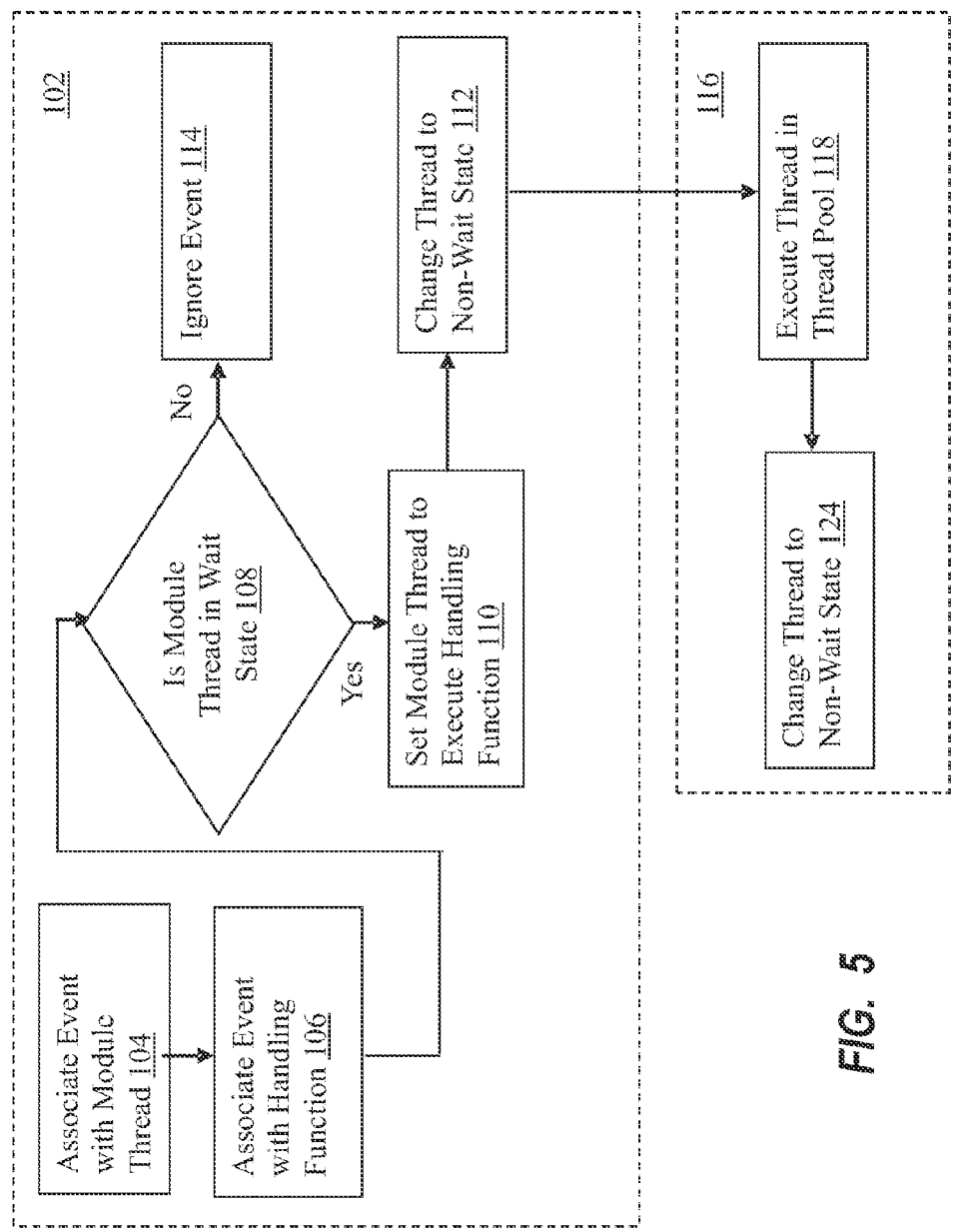
FIG. 5 is a process flow diagram of methods for handling user-generated events using event-driven state threads in accordance with an embodiment of the present invention.

Referring to FIG. 5, while still referring to FIG. 4, at step 102, the event is handled by the application framework 28. Step 102 may include mapping the event to a module thread 32 at step 104. At step 106 the event is mapped to a handling function using the associations generated in steps 88-94. At step 108, the application framework evaluates whether the module thread 32 identified in step 104 is in the 'wait' state. If it is, then at step 110 the module thread 32 is set to execute the handling function identified in step 106. The module thread 32 is then changed to a 'non-wait' or 'active' state at step 112. if the thread is not in the wait state at step 108, then the event may be ignored at step 114

At step 116, the module thread 32 is processed. Processing at step 116 may include executing the thread within a thread pool under the control of the system thread manager 24 at step 118. Processing at step 118 may also include transmitting updated user interface data and other information at step 120 and displaying the updated information on the local GUI or remote browser 40 at step 122. When the handling function ends execution, the state of the module thread 32 is changed back to 'wait' at step 124, which causes the thread manager 24 to pause execution of the module thread 32.

Embodiments include general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing multi-threading processes of an application framework module, the method comprising:
    initiating execution of an application framework module of a single application; receiving a plurality of requests for interaction with the application framework module; for each request in the application framework module of the single application,
        instantiating a thread including a plurality of state data structures, wherein the thread persists during execution of the application framework module and the state data structures store a thread state and library data and user data, wherein the thread state, library data, and user data collectively define an operating context that is specific to the thread, and the operating context of the thread is local to the application in scope;
        associating a plurality of events with the thread, placing the thread in a wait state;
        receiving a plurality of user-generated events by the application framework module;
        associating each of the plurality of user-generated events with one of the threads;
        modifying each thread associated with one of the user generated events to execute a function corresponding to the user-generated event associated therewith and placing the thread in a non-wait state; and
        processing all threads in the non-wait state according to a multi-tasking protocol, wherein processing one of the threads includes accessing one or more of libraries and static variables of global scope, wherein each of the threads is in the wait state or in the non-wait state and wherein the thread state, the library data, and the user data is maintained in a memory for each of the threads in the wait state
        wherein a thread manager associated with an operating system manages concurrent execution of the threads while the threads are associated only with the single application and operate in the context of the single application.

2. The method of claim 1, wherein processing all threads in the non-wait state comprises changing the state data structures thereof.

3. The method of claim 2, wherein processing all threads in the non-wait state further comprises processing state data structures thereof.

4. The method of claim 1, wherein processing all threads in the non-wait state comprises pausing processing by placing the threads in the wait state.

5. The method of claim 1, wherein associating a plurality of events with one of the threads comprises:
    communicating an event identifier to the thread by the application and receiving a function identifier from the thread; and
    mapping the event identifier to the function identifier and the thread in an event map.

6. The method of claim 5, wherein modifying each thread associated with one of the user generated events to execute the function corresponding to the user-generated event associated therewith comprises:
    looking up the event in the event map; and
    setting the thread to execute a function associated with a function identifier mapped to the event and the thread within the event map.

7. The method of claim 1, wherein instantiating a thread further comprises linking at least one function library therewith.

8. The method of claim 6, wherein linking at least one function library with a thread comprises associating a plurality of static variables with the thread.

9. The method of claim 1, wherein each thread corresponds to a different module having a distinct functionality relative to other modules.

10. The method of claim 1, further comprising receiving the plurality of requests from browsers executing on remote workstations.

11. The method of claim 10, further comprising receiving user events from the browsers.

12. The method of claim 11, wherein processing all threads in the non-wait state according to the multi-tasking protocol comprises transmitting data to the browsers.

13. The method of claim 1, further comprising receiving the plurality of requests from a user input device coupled to a computer locally executing the application framework module.

14. The method of claim 1, wherein processing all threads in the non-wait state according to a multi-tasking protocol comprises executing the threads by a thread managing system of an operating system hosting execution of the application framework module.

15. A computing system comprising:
a general purpose computer having a processor programmed to process operational and executable data and a memory storing an application operable to instruct the processor to:
initiate execution of an application framework module of a single application;
receive a plurality of requests for an application resources;
for each request in the application framework module of the single application,
  instantiate a thread including a plurality of state data structures, associate a plurality of events with the thread, and place the thread in a wait state, wherein the thread persists during execution of the application framework module and the state data structures store a thread state and library data and user data, wherein the thread state, library data, and user data collectively define an operating context that is specific to the thread, and the operating context of the thread is local to the application in scope;
receive a plurality of user-generated events in the application framework module;
associate each of the plurality of user-generated events with one of the threads;
modify each thread associated with one of the user generated events by setting the thread to execute a function corresponding to the user-generated event associated therewith and placing the thread in a non-wait state; and
execute all threads in the non-wait state according to a multi-tasking protocol, wherein executing one of the threads includes accessing one or more of libraries and static variables of global scope, wherein each of the threads is in the wait state or in the non-wait state and wherein the thread state, the library data, and the user data is maintained in the memory for each of the threads in the wait state,
wherein a thread manager associated with an operating system manages concurrent execution of the threads while each of the threads are associated only with the single application and operate in the context of the single application.

16. The computing system of claim 15, further comprising a plurality of workstations remote from the general purpose computer and in data communication with the processor, each workstation executing a browser; wherein the browser is programmed to receive requests for an application resource and transmit the requests to the general purpose computer.

17. The computing system of claim 16, wherein the browsers are further programmed to receive user inputs and transmit the user inputs to the general purpose computer wherein the processor is programmed to receive a portion of the plurality of user generated events from the browsers.

18. The computing system of claim 15, wherein the processor is programmed to execute all threads in the non-wait by changing the state data structures thereof.

19. The computing system of claim 15, wherein the processor is programmed to pause execution of each thread in the non-wait by placing the threads in a wait state.

20. Computing system of claim 15, wherein each thread corresponds to a different module having a distinct functionality relative to other threads.

21. The computing system of claim 20, further comprising a user input device locally coupled to the general purpose computer, the processor further programmed to receive the plurality of requests from the user input device.

22. The computing system of claim 15, wherein the memory stores an operating system programmed to manage at least one of concurrent processing of all threads in the non-wait state according to the multi-tasking protocol.

* * * * *